April 26, 1938. O. W. BECKER 2,115,607
SAUSAGE CASING
Original Filed Aug. 3, 1931 2 Sheets-Sheet 1
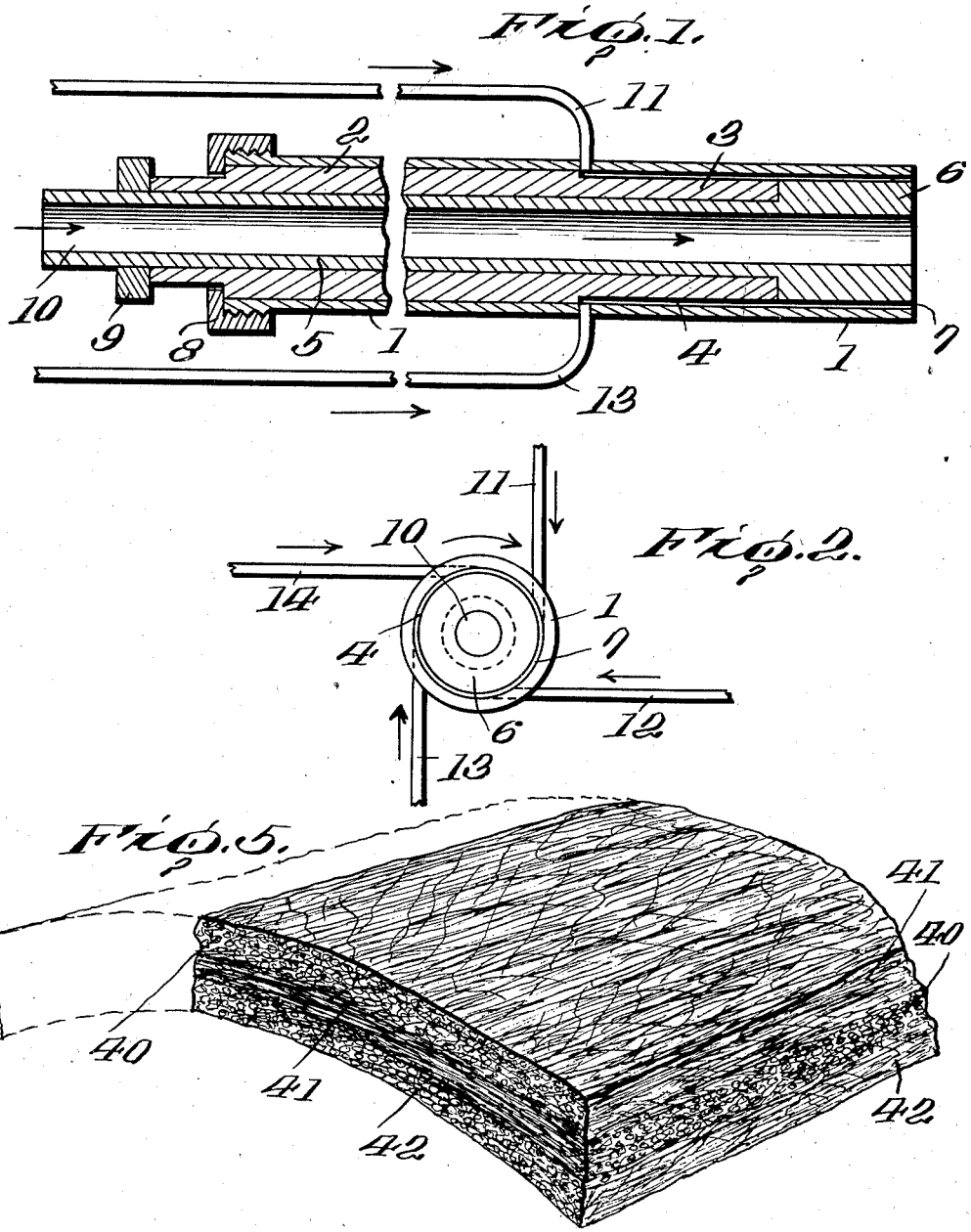
Inventor
O. W. Becker
By C. F. Wenderoth
Attorney

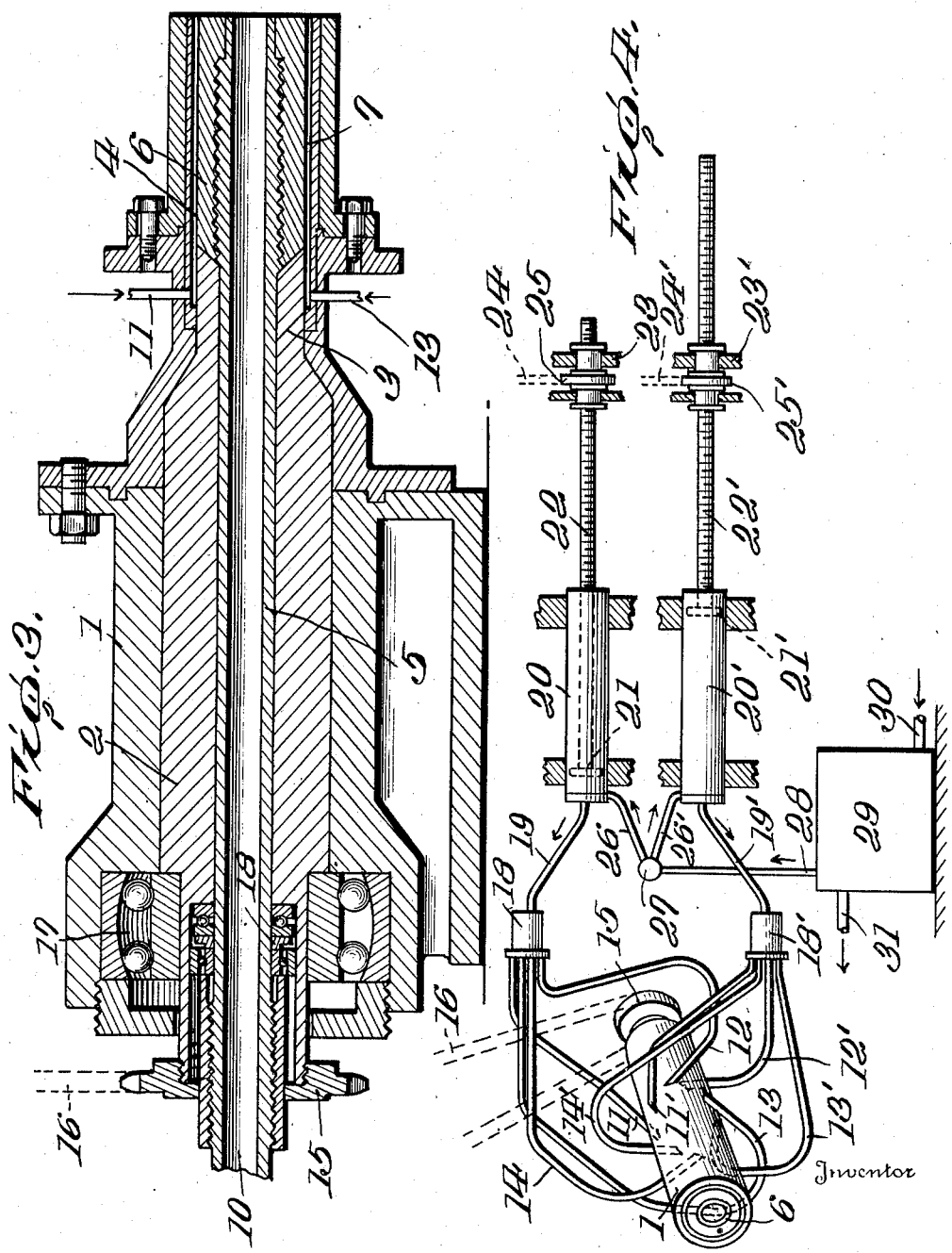

Patented Apr. 26, 1938

2,115,607

UNITED STATES PATENT OFFICE

2,115,607

SAUSAGE CASING

Oskar Walter Becker, Heidelberg, Germany, assignor to the firm of Naturin Gesellschaft mit beschrankter Haftung, Weinheim—B., Germany Original application August 3, 1931, Serial No. 554,919. Divided and this application January 21, 1936, Serial No. 60,123. In Germany August 7, 1930

2 Claims. (Cl. 99—176)

This application is a division of my application Serial No. 554,919, filed August 3rd, 1931, for Method of and apparatus for making artificial sausage casings.

This invention relates to an artificial sausage casing.

Many methods of making artificial sausage casings are known. The material used in such known methods is either of animal or vegetable nature.

It has for example, been proposed to impregnate a fabric of material or silk in suitable manner. The disadvantage of this method consists in this that the appearance of a wholly indigestible fabric is retained and the finished sausage is dull and has no life.

Moreover, animal or vegetable materials have been applied to a fabric which after the drying operation is completed, is again withdrawn from the interior of the casing. Sausage casings thus produced have a natural lustre but they retain particularly for the expert, always the disturbing mark of the fabric and therefore the nature of an artificial product is recognized.

A further known method consists in pressing a thin mixture formed from animal fibers by centrifugal force against the inner walls of rotating tubes and supplying heat to such tubes so that the drying mass due to its shrinkage separates from the tube walls itself in a tubular form. The irregular deposit of the fibers due even to slightly eccentric running of the rotating tubes and consequent irregular drying and separation and tearing of the drying gut, are among the disadvantages of this method.

It has also been proposed to spray a fluid mass which consists of softened sinews through an annular nozzle. The disadvantage of this method lies in the difficulty of converting the sinews into completely homogeneous liquid or thinly fluid mass, so that they can be sprayed so uniformly from fine annular nozzles that the nozzles will not become choked and that the sausage casing will have a smooth surface free from any lumps. In addition, in this method the desired deposit in layers of the fibers recognized as preferable is not obtainable. A further disadvantage of this method lies in the large quantity of water which is necessary to bring the starting material into a thin soup-like or fluid condition. In order to evaporate this water again comparatively large and expensive drying installations are necessary. Moreover, a disadvantage of all known methods is that they are not continuous. The different steps of the process of production and the subsequent drying are repeated periodically. Consequently not only are large installations and many operations required but due to the periodical charging and discharge of the drying chambers, great heat losses occur.

The method mentioned of producing casings by spraying a fluid mass formed from softened sinews through an annular nozzle can be carried out continuously, but the casings obtained due to want of recognition of the importance of definite layering of the particles of the mass or fibers are practically incapable of use. By this spraying method a tubular casing is certainly obtained but the fibers of the product are only laid lengthwise so that the casing is insufficiently strong in the direction of its circumference. The recognition of this circumstance is the main foundation for the present invention.

In another group of known methods for producing sausage skins, cellulose has been employed as the starting material. These methods can be carried out continuously but the finished product is not suitable for requirements which must be based on an artificial gut if it is to appear as a complete substitute for a natural gut. Between cellulose and the animal materials of which natural gut consists, there are great and essential differences as regards chemical composition. Cellulose is, on the one hand, quite indigestible by man, and on the other hand, it is not sufficiently elastic to provide the properties of the animal skin. In order to obtain elastic expansion and contraction of the cellulose it must be treated with hygroscopic media. As a result the artificial gut produced from cellulose on account of too great sensitiveness to water must not be wetted like natural gut before use. The finished sausages have moreover, an unnatural noticeable high lustre.

If however, the treatment by hygroscopic medium be dispensed with, then the finished sausage casing does not possess the property of elastic contraction. It acts more like paper and forms ugly creases. Moreover, its porosity leaves something to be desired so that it is not suitable for preserved sausage, as this cannot then breathe.

In accordance with the invention all these disadvantages of known methods are avoided. In contradistinction to known methods there is not used a fluid or soup-like material of animal or vegetable origin, but a mass, the condition of which may be described as plastic or kneadable and is dough-like. The invention consists in this that the animal or vegetable material is first worked up to form this plastic kneadable mass and it is then pressed through annular nozzles or the like in continuous operation. For example, the skin or flesh parts after they have been washed can be subjected to suitable chemical dissolving processes, which cause the parts to swell. In this condition the skin or flesh parts (or the vegetable starting materials) are disintegrated or reduced to fibers. From the swollen or disintegrated material or material reduced to fibers there is produced by kneading without addition of water, a plastic mass of high consistency and tackiness. It is important, that in pressing this plastic kneadable material through the annular nozzles that the particles of the mass should be laid in different directions, preferably crosswise over one another and locked together.

In the accompanying drawings apparatus for performing this method is shown partly diagrammatic.

Figure 1 showing the apparatus in longitudinal section,

Figure 2 is a front elevation,

Figure 3 is a longitudinal section through the nozzle and the parts connected therewith, Figure 4 is a diagrammatic view showing all the parts with the nozzle shown at the left thereof, and Figure 5 is a partial sectional perspective view through a sausage casing upon a greatly enlarged scale.

Referring to the drawings, in a cylindrical housing 1 is mounted a core member 2 which may rotate about its longitudinal axis. The forward part 3 of this core member is reduced in diameter with respect to its remaining parts so as to form an annular space 4 between this front part and the housing 1. Within the rotating core member 2, 3 is located a stationary core 5, the forward part 6 of which projects beyond the forward part 3 of the core 2. The forwardly projecting part 6 of the core 5 is of such external diameter as to form between it and the housing 1 an annular space 7 which forms a continuation of the annular space 4. 8 denotes a collar nut and 9 an adjusting ring. The inner stationary core 5, 6 has a longitudinal bore 10 through which air under pressure can be blown in the direction of the arrow.

The material is introduced into the annular space 4 i. e. into the hollow chamber located on the rotating part of the outer core by way of tubes 11, 12, 13, 14 which as shown in Figure 2, are disposed preferably tangentially of the annular space 4. The material passing out through these tubes in the direction of the arrow is therefore fed in the direction of rotation of the annular space 4 and by this rotation is entrained immediately and distributed in the annular space 4.

It has been found by experiment that the plastic mass cannot be forced through annular nozzles under high pressure. In this case due to the high consistency of the plastic mass, a quite superficial layering of the particles of the mass or fibers takes place, so that the resulting tube falls apart again even with the slightest internal excess pressure. The construction of the apparatus for producing artificial sausage casings described has therefore been found preferable and necessary. It is on the one hand important that the plastic mass should be pressed through the thin tubes 11 to 14—the internal diameter of which may be for example 2 mms. or smaller—into the rear part of the annular nozzle, i. e. into the space 4. The mass is led to the tubes through a pressure cylinder or preferably through a number of pressure cylinders. On the other hand, it is important that a part of the annular nozzle, namely the forward part 3 of the outer core 2 should rotate in the direction of the streams of material passing out from the tubes while the forward part of the annular nozzle, the annular space 7 and the forward part 6 of the inner core bounding it on one side should be stationary. The following result is thus obtained.

During the passage of the plastic mass through the thin tubes the particles of the mass or fibers are all laid in the axial direction. By introducing them into the annular nozzle space 4 they are laid preferably tangentially or transversely with respect to the longitudinal direction of the resulting gut. There is thus produced a tubular casing which even in the undried condition has an astonishing strength in the peripheral direction. This is the more necessary as every cylindrical body has to sustain with an internal excess pressure in the direction of the periphery double the force which it does in the axial direction.

The supply of the plastic mass through the thin tubes prevents any formation of eddies within the mass. Any eddies produced would form irregularities in the thickness of the wall of the casing and in the departure from the straight cylindrical form would produce irregular layering of the mass of particles or fibers and the strength of the gut would be greatly reduced. The supply of the mass to the annular nozzles through a plurality of tubes permits further the use of two or more pressure cylinders one at least of which can be always in operation so that continuous operation is ensured.

The rotating core portion 3 effects the maintenance of the tangential layering of the fibers or particles of the mass. Further, a complete pressure balance takes place within the annular nozzle so that the tubular casing comes straight out from the nozzle. Further, by making the core rotate and by keeping the outer wall of the casing stationary the particles of the mass are thoroughly kneaded together or rolled.

If now in the forward movement through the annular nozzle the mass already formed of tube shape and connected together passes into the forward annular nozzle chamber 7, in which not only the outer wall but also the core portion is stationary, the disturbance of the particles of the mass or fibers on the surface of the tubular casing is effected in such manner that the fibers on this surface are directed from the tangential or peripheral direction into the axial direction. Moreover, a rotary forward movement of the projecting gut is prevented by this stationary annular nozzle chamber. In consequence of this disturbance of the fibers on the surface of the tubular casing superpositioning which may be described as transverse locking of the fibers takes place. The strength of the casing in the axial direction is thereby considerably increased so that the casing opposes in all directions very great resistance to tearing. Thus, since a maximum strength can be obtained from the material a gut of extraordinarily fine wall can be produced. The casings thus produced are themselves in their undried condition in a position to resist a not inconsiderable internal air pressure. They can therefore at once be subjected to continuous drying. As the amount of water contained in the plastic mass as already explained, is comparatively small, the drying operation of the finished casings takes very little time.

In Figures 3 and 4 parts corresponding to the showing in Figures 1 and 2 have the same reference characters. In Figure 3 the cylindrical housing as shown at 1 and 2 indicates the core member which may rotate about its longitudinal axis. The forward part of the core member is shown at 3 and an annular space 4 between the forward part 3 and the housing 1. The stationary core is shown at 5 with the forward part 6 of this core forming a separate piece screwed onto the member 5. An annular space 7 is provided between the forward part 6 and the housing 1 and a longitudinal bore 10 extends through the stationary core member 5. Of the small tubes destined to contact the plastic mass into the annular space 4 only two, namely the tubes 11 and 13 are shown.

At the end of the rotatable core member 2 a sprocket wheel 15 is fixed which is driven by a chain 16 indicated in dash and dotted lines. Ball bearings 17 and 18 are provided to eliminate friction. In Figure 4 the usual cylindrical housing 1 and the end of the stationary core member 6 are shown. For driving the core member a sprocket wheel 15 and a chain 16 are shown. Tangentially arranged with respect to the cylindrical housing 1 of the nozzle 8 tubes are shown instead of the four tubes shown in Figure 2. These tubes may be grouped into two groups, one of which contains the tube designated by the reference members 11, 12, 13, and 14 and the other group comprises the four other tubes bearing the reference numerals 11', 12', 13', and 14'.

The tubes of the first group are connected to a distributing device 18 while the four tubes of the second group are connected to a distributing device 18'. These devices are connected respectively by pipes 19 and 19' to press cylinders 20 and 20'. Pistons 21 and 21' are arranged movable respectively in the press cylinders. The movement of the pistons may be effected by means of screw spindles 22, 22', which are mounted in bearings 23, 23' and which may be rotated by means of chains 24 and 24' which extend over sprocket wheels 25 and 25'.

The press cylinders 20 and 20' are respectively connected by means of pipes 26, 26' to a distributing device 27 which is connected by means of a pipe 28 to an apparatus 29 which is filled with the plastic mass. The plastic mass may be driven out from the apparatus 29 by means of a desired medium, for instance, by means of oil under pressure which may be introduced into the apparatus 29 by the pipe 30 leaving the apparatus through a pipe 31.

The plastic mass which has been filled into the apparatus 29 is pressed out from this apparatus and is conducted through pipe 28 from the distributing device 27 either by pipe 26 or by pipe 26' into one of the cylinders 20 or 20'. The screw spindles 22, 22' are rotated in opposite directions by means of the driving chains 24 and 24'. When for example the upper spindle 22 is moved to the left in the drawings the plastic mass contained in cylinder 20 is pressed out through pipe 19 into device 18 and through the first group of the small tubes 11, 12, 13, and 14 into the annular space 4 which it leaves in the form of a hollow continuous cylinder casing.

At the same time the piston 21' is moved to the right because its spindle 22' is rotated in that sense so that the cylinder 20' is filled by the plastic mass entering said cylinder through pipe 26'.

After the two pistons have reached the respective ends of the cylinders the sense of rotation of the spindles 22, 22' is reversed so that now cylinder 20 will be filled with plastic mass from apparatus 29, whereas the plastic mass contained in the cylinder 20' is pressed out through pipe 19' and device 18' and through the pipes of the second group 11', 12', 13' and 14' into the annular space 4.

It will be noted from the above description of the method and the apparatus used in making the sausage casings that as the mass of the material is forced into the space 4 the majority of the fibers will be disposed transversely of the longitudinal axis of the finished sausage casing and that as the mass is forced outwardly out of the nozzle and comes into the space 7 that the material is then urged between the stationary housing 1 and the stationary member 6. This will give a wiping action upon the exterior and the interior of the casing, thereby re-arranging a portion of the fibers at such exterior and interior surfaces so as to extend substantially parallel with the longitudinal axis of the casing. This is shown in Figure 5 wherein 40 represents the fibers at approximately the center of the casing material and 41 the fibers at the exterior and 42 the fibers at the interior of the casing.

The fibers at the center of the casing will have a relatively large proportion thereof disposed transversely to the longitudinal axis of the casing and from the central portion to both the exterior and the interior a portion of the fibers will be disposed at intermediate angles to the longitudinal axis of the casing. It is of course understood that not all the fibers will be disposed exactly in the directions indicated, and throughout the entire casing there will be a felting or matting of the various fibers and at the same time a layer construction is present. This produces a casing which is exceptionally strong and resists strains in all directions. It is therefore apparent that the fibers are irregularly disposed and are dispersed in different directions so that an absolute felting or matting action takes plac rendering the casing capable of withstanding forces in all directions.

I claim:

1. An artificial sausage casing formed without a carrier from a plastic kneadable mass of pasty animal or vegetable fibers in which said casing has the fibers disposed in layers and the fibers of said layers are arranged in non-parallel relation.

2. An artificial sausage casing formed without a carrier from a plastic kneadable mass of pasty animal or vegetable fibers in which said casing has the fibers disposed in layers and the fibers of said layers are arranged in non-parallel relation with a substantial portion thereof disposed transversely of the longitudinal axis of the casing.

OSKAR WALTER BECKER.